June 24, 1941. F. ASSMUS 2,247,008
OPTICAL TESTING APPARATUS FOR LIQUIDS
Filed Sept. 21, 1937
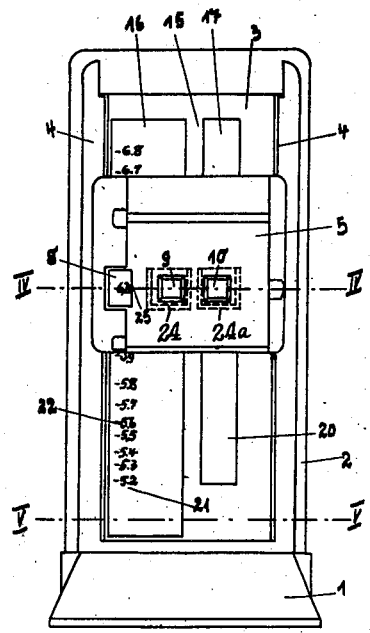
Fig. 1
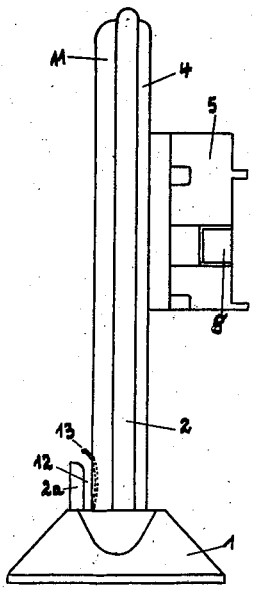
Fig. 2
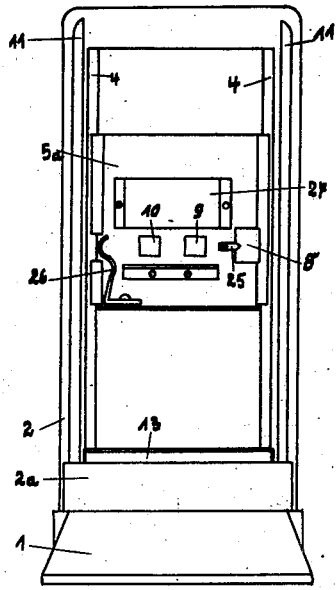
Fig. 3
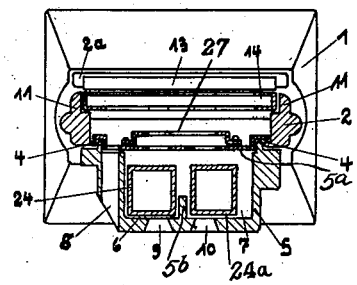
Fig. 4
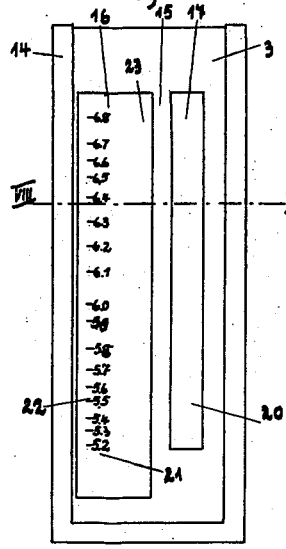
Fig. 6
Fig. 8
Fig. 5
Fig. 7
Fig. 9
Inventor
Friedrich Assmus
by his Attorney Patented June 24, 1941

2,247,008

UNITED STATES PATENT OFFICE 2,247,008

OPTICAL TESTING APPARATUS FOR LIQUIDS

Friedrich Asmus, Freiburg, Breisgau, Germany, assignor to F. Hellige & Co., Freiburg, Breisgau, Germany Application September 21, 1937, Serial No. 164,865
In Germany October 2, 1936

3 Claims. (Cl. 88—14)

This invention relates to the optical determination of chemical and other values, and has particular reference to the determination of the hydrogen ion concentration value, the so-called pH value of solutions and the like by optical comparison of the color of a solution or the like with a colored reference.

It is known that the color of certain coloring agents varies with the pH value of their solutions, and this value is a measure of their acid or basic value.

Conversely, the color variation can be utilized for the optical determination of the pH value by means of a reference and a calibrated color scale.

Apparatus for this purpose have already been devised but are comparatively complicated and expensive and their operation is not perfect.

It is an object of the invention to provide an apparatus of the kind described which is very simple and consequently cheap while at the same time it is easy to manipulate and reliable.

To this end the apparatus is equipped with a frame, preferably erected on a suitable base, and having a rectangular opening. On this frame is mounted to slide a box-shaped support for the liquid under test which is normally placed in a cuvette inserted in the support. The support has a hole for looking through the liquid and two more holes for respectively viewing a reference strip and a scale. The reference strip and the scale are placed in a detachable holder and means are provided for securing the holder to the frame.

The apparatus comprises a plurality of self-contained and exchangeable units and requires but a few manipulations for assembling and disassembling it. The reference strip and the scale can be readily exchanged for others which, for instance, may have been purchased later by the operator.

The measuring elements, i. e. the color scale, the reference strip and the cuvette, are combined and adjusted in a novel manner.

Delicate parts of the apparatus are so arranged that they will not be damaged by frequent operation.

A further object of the invention is to provide means for obtaining transition colors.

To this end the reference strip is made of a pair of superimposed colored wedges the densities of which vary in opposite directions.

The objects of the invention are attained by connecting the several parts representing the values to be compared in a common frame so that they are adjustable with respect to each other, and readily exchangeable.

In the accompanying drawing, an apparatus embodying the invention is illustrated by way of example:

Fig. 1 is a front elevation.

Fig. 2 is a side elevation viewed from the left in Fig. 1, and

Fig. 3 is a rear elevation of the apparatus with the holder for the scale and reference removed.

Figs. 4 and 5 are sections on lines IV—IV and V—V in Fig. 1 respectively.

Fig. 6 shows in front view the holder with a scale and reference strip.

Fig. 7 is an end elevation of the holder, viewed from the right in Fig. 6.

Fig 8 is a section on line VIII—VIII of Fig. 6, and

Fig. 9 is a part vertical section showing the colored wedges referred to.

The apparatus comprises a base 1, a frame 2 on the base, here shown with a rectangular opening, a detachable holder 14 for a plate of transparent glass with color scale and reference strip, and a slide 5a which is guided by rebates 4 in the front side of frame 2 and to which is secured a box shaped support 5. A rib 5b projecting inwardly from the front wall of the support 5 subdivides it into two compartments 6 and 7. 8 is a peep hole at the left in said support for viewing an index 25, as will be described, 9 is a peep hole for looking through the liquid under test in a cuvette 24 inserted in compartment 6, Fig. 4, and 10 is a peep hole for viewing the colored reference strip. Referring now to Fig. 3 showing the apparatus from the rear the holder 14 having been removed, 26 is a blade spring on the slide 5a and the free end of the blade spring bears against the corresponding inner face of frame 2 to hold the slide in position by friction, and 27 is a clip in which a color screen, not shown, can be inserted if desired.

11 are rebates at the rear of the frame 2 for the reception of a holder 14 which, as shown in Fig. 8, has channel cross-section, a pair of inwardly projecting edges at its ends defining a rectangular opening. The holder 14 is placed in the rebates 11 of the frame and held by a laminated spring 13 inserted in a space 12 between the rear side of frame 2 and a short vertical abutment 2a.

A front plate 3 inserted in the holder 14 behind the inwardly projecting edges mentioned has two rectangular apertures 16 and 17 and a band 15 between them. Two plates 18 and 19 are inserted in the frame 14 behind the front plate 3. These plates are of glass or any other suitable material, the front plate 18 being transparent and the rear plate 19 being translucent, for instance of ground glass. Between the plates 18 and 19 a colored reference strip 20 and a scale 21 are located. The scale 21 has numerals 22 preferably produced by photographic blackening of a sensitized layer and here showing pH values, and a transpartent area 23 at the side of the numerals which is in line with hole 9.

The reference strip 20 and the scale 21 consist of layers of gelatine attached to the back of the transparent glass plate 18.

To obtain in the reference strip 20 a gradual change of color corresponding to the change which occurs in liquids whose pH value is to be determined, the reference strip 20 preferably is composed of two superimposed color wedges 28 and 29 enclosed between the plates 18 and 19, Fig. 9. Each wedge is of different color, for instance, the color of the front wedge 28 is purple, and that of the rear wedge 29 is yellow. The densities of the wedges vary in opposite directions, that is, the density of the front wedge 28 decreases from its upper to its lower end, and the density of the rear wedge 29 decreases from its lower to its upper end. By these means a uniform and gradual change from purple to yellow is obtained.

The operation of the apparatus is as follows:

The cuvette 24 is filled with a solution whose pH value is to be determined and to the solution a coloring agent for producing the necessary change of color is added. It has been supposed that the substance under test is a solution of brome kresol purple whose pH value is 6.8 to 5.2 as shown on the scale 21. The box-shaped support 5 is raised and lowered until the same color appears in the peep holes 9 and 10. The corresponding pH value, 6.2 in the present instance, is indicated in the peep hole 8 by the index 25.

If desired, a cuvette 24a is filled with a color compensation liquid and placed in the compartment 7 of the box-shaped support 5.

The apparatus may be made of any suitable material and preferably its parts are produced by molding under pressure a suitable composition of artificial resin. This reduces the cost of manufacture to a minimum.

It is understood that the range of usefulness of the apparatus is not limited to the determination of pH values, as described by way of example, but can be used in all cases where it is desired to compare colors.

The simplicity of the apparatus will appear from the foregoing description. It comprises self-contained and exchangeable units and the ease of its operation and manipulation due to the several improvements effected is obvious.

Providing the holder 14 for the plate 18 with the scale and the color reference has the advantage that the plate is readily exchangeable for any plate which the operator may purchase.

I claim:

1. An apparatus for testing the pH values of liquids, comprising in combination a base, an open rectangular frame upright in said base, guides on said frame, a box-shaped support on the front side of said frame vertically slidable in said guides and having three peep holes arranged side by side in the same horizontal plane, an index in the left peep hole, a short partition separating said support into two chambers, a plate of transparent glass and a plate of translucent glass removably fitted in the rear end of said frame, a reference strip of non-uniform color, a measuring scale gauged to the pH values of said reference strip both the strip and the scale attached to the rear side of said plate of transparent glass, a transparent vessel for the liquid to be tested removably inserted in the left hand compartment of said support said vessel and support adapted to be moved into horizontal alignment with the color value on said reference strip corresponding to the color of the liquid in said vessel, the pH value of the liquid of this color value being readable on said measuring scale through the left peep hole.

2. In an apparatus as specified in claim 1, a second vessel filled with compensation liquid removably inserted in the right hand compartment of the box-shaped support.

3. An apparatus as specified in claim 1, in which the reference strip behind the plate of transparent glass is composed of two superposed differently colored wedges the density of the front wedge decreasing from the upper to the lower end and the density of the rear wedge decreasing from the lower to the upper end.

FRIEDRICH ASSMUS.